(12) United States Patent
Wang et al.

(10) Patent No.: US 12,294,079 B2
(45) Date of Patent: May 6, 2025

(54) LITHIUM-MANGANESE RICH MATERIAL, PREPARATION METHOD THEREFOR AND USE THEREOF

(71) Applicant: BEIJING EASPRING MATERIAL TECHNOLOGY CO., LTD., Beijing (CN)

(72) Inventors: Jun Wang, Beijing (CN); Yafei Liu, Beijing (CN); Yanbin Chen, Beijing (CN)

(73) Assignee: BEIJING EASPRING MATERIAL TECHNOLOGY CO., LTD., Beijing (CN)

( * ) Notice: Subject to any disclaimer, the term of this patent is extended or adjusted under 35 U.S.C. 154(b) by 142 days.

(21) Appl. No.: 17/767,246

(22) PCT Filed: Dec. 31, 2020

(86) PCT No.: PCT/CN2020/142040
§ 371 (c)(1),
(2) Date: Apr. 7, 2022

(87) PCT Pub. No.: WO2021/136490
PCT Pub. Date: Jul. 8, 2021

(65) Prior Publication Data
US 2022/0393155 A1    Dec. 8, 2022

(30) Foreign Application Priority Data
Dec. 31, 2019    (CN) .......................... 201911422090.2

(51) Int. Cl.
*C01G 45/22*    (2025.01)
*C01G 45/1228*    (2025.01)
(Continued)

(52) U.S. Cl.
CPC ............ *H01M 4/366* (2013.01); *C01G 53/50* (2013.01); *H01M 4/505* (2013.01); *H01M 4/525* (2013.01);
(Continued)

(58) Field of Classification Search
CPC .... C01G 45/1228; C01G 45/22; C23C 24/00; C23C 24/085; C23C 30/00; Y10T 428/2991
See application file for complete search history.

(56) References Cited

U.S. PATENT DOCUMENTS

| | | | |
|---|---|---|---|
| 2006/0105239 | A1 | 5/2006 | Paulsen et al. |
| 2013/0318780 | A1 | 12/2013 | Tsunozaki et al. |
| 2017/0077496 | A1 | 3/2017 | Liu et al. |
| 2018/0108908 | A1 | 4/2018 | Li et al. |

FOREIGN PATENT DOCUMENTS

| | | |
|---|---|---|
| CN | 102751480 A | 10/2012 |
| CN | 104022280 A | 9/2014 |

(Continued)

OTHER PUBLICATIONS

Pan et al., Effect of lithium content on electrochemical property of Li1+x(Mn0.6Ni0.2Co0.2)1-xO2 (0≤x≤0.3) composite cathode materials for rechargeable lithium-ion batteries, Trans. Nonferrous Met. Soc. China 28 (2018) 145-150 (Year: 2018).*

*Primary Examiner* — Hoa (Holly) Le
(74) *Attorney, Agent, or Firm* — Volpe Koenig

(57) ABSTRACT

The present disclosure discloses a lithium-manganese rich material and a preparation method and a use thereof.

15 Claims, 3 Drawing Sheets

(51) Int. Cl.
  *C01G 53/50* (2025.01)
  *H01M 4/36* (2006.01)
  *H01M 4/505* (2010.01)
  *H01M 4/525* (2010.01)
  *H01M 4/02* (2006.01)
  *H01M 10/0525* (2010.01)

(52) U.S. Cl.
  CPC ...... *C01P 2002/52* (2013.01); *C01P 2002/72* (2013.01); *C01P 2004/03* (2013.01); *C01P 2004/61* (2013.01); *C01P 2004/84* (2013.01); *C01P 2006/12* (2013.01); *C01P 2006/40* (2013.01); *H01M 2004/021* (2013.01); *H01M 2004/028* (2013.01); *H01M 10/0525* (2013.01)

(56) References Cited

FOREIGN PATENT DOCUMENTS

| | | | |
|---|---|---|---|
| CN | 105161679 | A | 12/2015 |
| CN | 107768642 | A | 3/2018 |
| CN | 107834041 | A | 3/2018 |
| CN | 107834050 | A | 3/2018 |
| CN | 108091843 | A | 5/2018 |
| CN | 109390574 | A | 2/2019 |
| CN | 109461928 | A | 3/2019 |
| CN | 110422890 | A | 11/2019 |
| CN | 111082029 | A | 4/2020 |
| KR | 20180089030 | A | 8/2018 |

\* cited by examiner

LITHIUM-MANGANESE RICH MATERIAL, PREPARATION METHOD THEREFOR AND USE THEREOF

CROSS REFERENCE TO RELATED APPLICATIONS

This application is a 35 USC § 371 National Stage application of International Patent Application No. PCT/CN2020/142040, which was filed Dec. 31, 2020, entitled "LITHIUM-MANGANESE RICH MATERIAL, PREPARATION METHOD THEREFOR AND USE THEREOF" and claims priority to Chinese Patent Application No. 201911422090.2, filed on Dec. 31, 2019, which is incorporated herein by reference as if fully set forth.

FIELD

The present disclosure relates to the technical field of lithium-ion battery, and particularly to a lithium-manganese rich material, a method for preparing a lithium-manganese rich material, a lithium-manganese rich material prepared with the method, and a use of the lithium-manganese rich material in the lithium-ion battery.

BACKGROUND

The new energy vehicles have been vigorously developing with a flourishing prospect in recent years as an emerging industry of the national strategy in China for coping with the environmental pollution and energy crisis, the lithium-ion batteries are widely used as new energy carriers with excellent overall performance in the electric vehicles, energy storage power stations, communication and digital electronic products, and other markets.

The cathode is used as a key core material of the lithium ion battery, and directly determines the technical performance level of the battery. With the continually stringent demand on the energy density of lithium ion batteries imposed by various application fields, the commercialized cathode materials mainly comprise layered $LiMO_2$ (M refers to Ni, Co, Mn, etc.), spinel type $LiMn_2O_4$ and olivine type $LiFePO_4$. Wherein the $LiCoO_2$ has a high cost; the $LiMn_2O_4$ with a spinel structure is prone to generate crystal transformation Jahn-Teller effect and dissolution of manganese ions in the cycling process, such that the battery capacity is quickly attenuated, and the high-temperature performance is poor; the layered positive electrode material $LiNi_{1-x-y}Co_xMn_yO_2$ reduces the material cost and improves the performance due to the synergistic effect of Ni, Co and Mn, but the actual specific capacity lacks a significant breakthrough, it can hardly meets the requirements of users.

The layered lithium-manganese rich material has attracted the extensive attention from the people by virtue of high specific capacity (>250 mAh/g), high safety, low price and other advantages, and becomes a new generation of power lithium ion battery cathode material with the most development potential. However, the material will be transformed from a layered structure to a spinel structure in a cyclic process, which causes severe voltage decay, reduces the energy density of the material, and increases the difficulty of a battery management system, thereby seriously hindering the commercial application process of the material.

Therefore, it is significantly important to develop of a lithium-rich manganese-based cathode material with high specific capacity, high safety and excellent cycle stability.

SUMMARY

An object of the present disclosure is to provide a new lithium-manganese rich material, which overcomes the defects in the prior art that the lithium-manganese rich material is susceptible to a structural transformation during the cyclic process, resulting in a voltage decay and a reduced energy density of the material.

In order to achieve the above object, a first aspect of the present disclosure provides a lithium-manganese rich material comprising a matrix and a coating layer coated on a surface of the matrix;

wherein the matrix contains a substance represented by a chemical formula $Li_{1.2+x}[(Mn_{1-a-b-c}CO_aNi_bM_c)_{1-d}M'_d]_{0.8-x}O_2$, wherein $-0.2 \leq x \leq 0.3$, $0 \leq a \leq 0.3$, $0 \leq b \leq 0.3$, $0 \leq c \leq 0.1$, $0 \leq d \leq 0.1$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;

the coating layer contains a substance represented by a chemical formula $Li_u(Li_{1-v-y}N_vN'_y)O_2$, wherein $0.8 \leq u \leq 1.2$, $0.6 \leq v \leq 0.9$, $0 \leq y \leq 0.1$, N is at least one element selected from the group consisting of Mn, Co, Ni, Fe, Ru and Mo; N' is at least one element selected from the group consisting of Al, B, Ba, Ce, Cr, Co, Cu, Fe, K, La, Mg, Mn, Mo, Na, Nb, Ni, Os, Pr, Re, Ru, Sc, Sr, Sm, Ta, Ti, V, W, Y, Yb, Zn and Zr;

a content ratio by weight of the matrix to the coating layer in the material is 100:0.01-10.

In a second aspect, the present disclosure provides a method of preparing a lithium-manganese rich material comprising the following steps:

subjecting a matrix substance A and a coating substance B to a first mixing to obtain a lithium-manganese rich material;

wherein the chemical formula of the matrix substance A is $Li_{1.2+x}[(Mn_{1-a-b-c}CO_aNi_bM_c)_{1-d}M'_d]_{0.8-x}O_2$, wherein $-0.2 \leq x \leq 0.3$, $0 \leq a \leq 0.3$, $0 \leq b \leq 0.3$, $0 \leq c \leq 0.1$, $0 \leq d \leq 0.1$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;

the chemical formula of the coating material substance B is $Li_u(Li_{1-v-y}N_vN'_y)O_2$, wherein $0.8 \leq u \leq 1.2$, $0.6 \leq v \leq 0.9$, $0 \leq y \leq 0.1$, N is at least one element selected from the group consisting of Mn, Co, Ni, Fe, Ru and Mo; N' is at least one element selected from the group consisting of Al, B, Ba, Ce, Cr, Co, Cu, Fe, K, La, Mg, Mn, Mo, Na, Nb, Ni, Os, Pr, Re, Ru, Sc, Sr, Sm, Ta, Ti, V, W, Y, Yb, Zn and Zr;

a weight ratio of the used amounts of the matrix substance A to the coating layer substance B is 100:0.01-10.

In a third aspect, the present disclosure provides a lithium-manganese rich material prepared with the method of the aforesaid second aspect.

In a fourth aspect, the present disclosure provides a use of the aforesaid lithium-manganese rich material in a lithium ion battery.

Compared with the prior art, the technical solutions provided by the present disclosure at least exhibits the following advantages:

1. The lithium-manganese rich material provided by the present disclosure has a high specific charge-discharge capacity, a high initial coulombic efficiency performance and an excellent rate capability.

2. The lithium-manganese rich material provided by the present disclosure exhibits an excellent cycle stability, it is structurally stable during the electrochemical cycling, thus has excellent structural stability.
3. The lithium-rich manganese-based cathode material provided by the present disclosure has an advantage of large tap density, which is further conducive to the improvement of volumetric energy density of the battery.
4. The preparation method provided by the present disclosure has the advantages such as simple process, no pollution, simple introduction mode of the doping elements and the coating layer, controllable process and suitability for industrial production.

DETAILED DESCRIPTION

Figure 1:
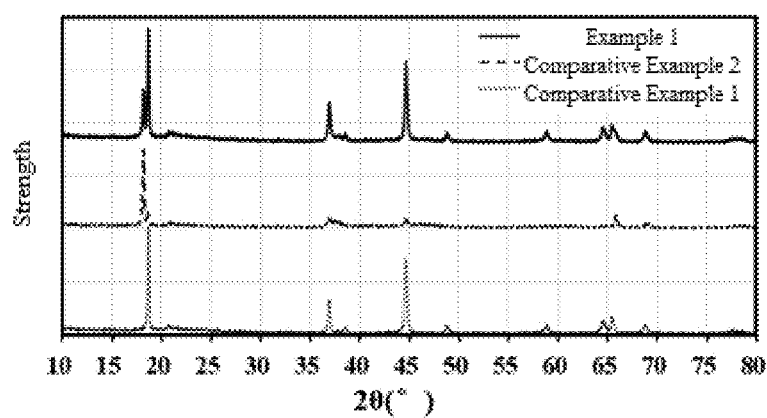
FIG. 1 illustrates a graph showing the X-Ray Diffraction (XRD) test results of the materials prepared in Example 1 and Comparative Examples 1-2.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As previously mentioned, a first aspect the present disclosure provides a lithium-manganese rich material comprising a matrix and a coating layer coated on a surface of the matrix;
wherein the matrix contains a substance represented by a chemical formula $Li_{1.2+x}[(Mn_{1-a-b-c}Co_aNi_bM_c)_{1-d}M'_d]_{0.8-x}O_2$, wherein $-0.2 \leq x \leq 0.3$, $0 \leq a \leq 0.3$, $0 \leq b \leq 0.3$, $0 \leq c \leq 0.1$, $0 \leq d \leq 0.1$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;
the coating layer contains a substance represented by a chemical formula $Li_u(Li_{1-v-\gamma}N_vN'_\gamma)O_2$, wherein $0.8 \leq u \leq 1.2$, $0.6 \leq v \leq 0.9$, $0 \leq \gamma \leq 0.1$, N is at least one element selected from the group consisting of Mn, Co, Ni, Fe, Ru and Mo; N' is at least one element selected from the group consisting of Al, B, Ba, Ce, Cr, Co, Cu, Fe, K, La, Mg, Mn, Mo, Na, Nb, Ni, Os, Pr, Re, Ru, Sc, Sr, Sm, Ta, Ti, V, W, Y, Yb, Zn and Zr;
a content ratio by weight of the matrix to the coating layer in the material is 100: 0.01-10.

In the present disclosure, the coating comprises attaching the coating layer on a surface of the matrix.

Preferably, the material has a median particle diameter $D_{50}$ of 6-20 μm.

Preferably, the material has a specific surface area of 2-7.5 $m^2/g$.

As previously mentioned, a second aspect of the present disclosure provides a method of preparing a lithium-manganese rich material comprising the following steps:
subjecting a matrix substance A and a coating substance B to a first mixing to obtain a lithium-manganese rich material;
wherein the chemical formula of the matrix substance A is $Li_{1.2+x}[(Mn_{1-a-b-c}Co_aNi_bM_c)_{1-d}M'_d]_{0.8-x}O_2$, wherein $-0.2 \leq x \leq 0.3$, $0 \leq a \leq 0.3$, $0 \leq b \leq 0.3$, $0 \leq c \leq 0.1$, $0 \leq d \leq 0.1$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;
the chemical formula of the coating material substance B is $Li_u(Li_{1-v-\gamma}N_vN'_\gamma)O_2$, wherein $0.8 \leq u \leq 1.2$, $0.6 \leq v \leq 0.9$, $0 \leq \gamma \leq 0.1$, N is at least one element selected from the group consisting of Mn, Co, Ni, Fe, Ru and Mo; N' is at least one element selected from the group consisting of Al, B, Ba, Ce, Cr, Co, Cu, Fe, K, La, Mg, Mn, Mo, Na, Nb, Ni, Os, Pr, Re, Ru, Sc, Sr, Sm, Ta, Ti, V, W, Y, Yb, Zn and Zr;
a weight ratio of the used amounts of the matrix substance A to the coating layer substance B is 100: 0.01-10.

According to the method of the second aspect of the present disclosure, the coating layer substance B is coated on a surface of the matrix substance A to form the lithium-manganese rich material.

Preferably, according to the method of the second aspect of the present disclosure, the lithium-manganese rich material has a median particle diameter $D_{50}$ of 6-20 μm.

Preferably, the lithium-manganese rich material has a specific surface area of 2-7.5 $m^2/g$.

Preferably, the first mixing is performed in an oxygen-containing atmosphere, the conditions of the first mixing comprise: a temperature of 300-1,000° C. and a time of 2-15 h.

According to a preferred embodiment of the present disclosure, the method further comprises preparing the matrix substance A with the following steps:
(1) subjecting the ingredients of the component C to a second mixing, in the presence of a first solvent, so as to obtain a matrix precursor, wherein the component C comprises a first complexing agent, a first precipitant and a manganese salt, and optionally comprises at least one of a cobalt salt, a nickel salt and a first doping agent, wherein the first doping agent contains the element M;
(2) subjecting the matrix precursor and the ingredients of the component D to a third mixing to obtain a matrix substance A, wherein the component D comprises a first lithium salt, and optionally further comprises a second doping agent, wherein the second doping agent contains the element M;
wherein M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;

the manganese salt, the cobalt salt, the nickel salt, the first doping agent, the first lithium salt, and the second doping agent are used in amounts such that the prepared matrix substance A is represented by a chemical formula $Li_{1.2+x}[(Mn_{1-a-b-c}Co_aNi_bM_c)_{1-d}M'_d]_{0.8-x}O_2$, wherein $-0.2 \leq x \leq 0.3$, $0 \leq a \leq 0.3$, $0 \leq b \leq 0.3$, $0 \leq c \leq 0.1$, $0 \leq d \leq 0.1$.

Preferably, the second mixing in step (1) is performed in a reaction vessel, the conditions of the second mixing comprise: a temperature of 20-60° C., a time of 6-30 h, a rotation speed of 300-1,000 rpm and a pH of 7-12.

According to a preferred embodiment of the present disclosure, the third mixing in step (2) is performed in an oxygen-containing atmosphere, the conditions of the third mixing comprise: initially carrying out a reaction under the first conditions to obtain a reactant, then subjecting the reactant to a reaction under the second conditions, wherein the first conditions comprise a temperature of 300-600° C. and a heat preservation time of 1-6 h; the second conditions comprise a temperature of 650-1,000° C. and a heat preservation time of 4-20 h.

According to another preferred embodiment of the present disclosure, the third mixing in step (2) is performed in an oxygen-containing atmosphere, the conditions of the third mixing comprise a temperature of 300-1,000° C. and a heat preservation time of 1-20 h.

Preferably, the manganese salt, the cobalt salt and the nickel salt in step (1) are each independently at least one selected from the group consisting of a sulfate salt, a nitrate salt, a chloride salt, an acetate salt and a citrate salt, for example, the manganese salt is at least one selected from the group consisting of manganese sulfate, manganese cobaltate, manganese chloride, manganese acetate and manganese citrate, the cobalt salt is at least one selected from the group consisting of cobalt sulfate, cobalt cobaltate, cobalt chloride, cobalt acetate, cobalt citrate, and the nickel salt is at least one selected from the group consisting of nickel sulfate, nickel cobaltate, nickel chloride, nickel acetate, nickel citrate.

Preferably, the first doping agent refers to at least one of an oxide, a phosphate, a fluoride and a carbonate containing the element M.

Preferably, the second doping agent means at least one of an oxide, a phosphate, a fluoride and a carbonate containing the element M'.

Preferably, the first complexing agent is at least one selected from the group consisting of ammonia water, salicylic acid, ammonium sulphate and ammonium chloride.

Preferably, the first precipitant is at least one selected from the group consisting of sodium hydroxide, potassium hydroxide, sodium carbonate and potassium carbonate.

In the present disclosure, the first complexing agent and the first precipitant are used in amounts such that a pH of the system at the time of the second mixing in step (1) is 7-12.

Preferably, the first lithium salt in step (2) is at least one selected from the group consisting of lithium nitrate, lithium chloride, lithium hydroxide and lithium carbonate.

According to another preferred embodiment of the present disclosure, the method further comprises preparing the coating layer substance B through the following steps:

(a) subjecting the ingredients of the component E to a fourth mixing, in the presence of a second solvent, so as to obtain a coating layer precursor, wherein the component E comprises a second complexing agent, a second precipitant and a metal salt containing the element N, and optionally further comprises a third doping agent, wherein the third doping agent contains the element N';

(b) subjecting the coating layer precursor, a second lithium salt and a sodium salt to a fifth mixing to obtain a coating layer intermediate product;

(c) subjecting the coating layer intermediate product and a third lithium salt to a sixth mixing, so as to prepare a coating layer substance B;

the element N is at least one element selected from the group consisting of Mn, Co, Ni, Fe, Ru and Mo; the element N' is at least one element selected from the group consisting of Al, B, Ba, Ce, Cr, Co, Cu, Fe, K, La, Mg, Mn, Mo, Na, Nb, Ni, Os, Pr, Re, Ru, Sc, Sr, Sm, Ta, Ti, V, W, Y, Yb, Zn and Zr;

the total amount of the second lithium salt and the third lithium salt and the amount of the metal salt and the amount of the third doping agent are used in amounts such that the coating layer substance B is represented by a chemical formula $Li_u(Li_{1-v-\gamma}N_vN'_\gamma)O_2$, wherein $0.8 \leq u \leq 1.2$, $0.6 \leq v \leq 0.9$, $0 \leq \gamma \leq 0.1$.

Preferably, the fourth mixing in step (a) is performed in a reaction vessel, the conditions of the fourth mixing comprises: a temperature of 20-50° C., a time of 5-15 h, a rotation speed of 300-1,000 rpm and a pH of 7-12.

Preferably, the conditions of the fifth mixing in step (b) comprise: the fifth mixing is performed in an oxygen-containing atmosphere at a temperature of 600-1,000° C. and a time of 4-20 h.

Preferably, the conditions of the six mixing in step (c) comprise: the six mixing is performed in an oxygen-containing atmosphere at a temperature of 300-700° C. and a time of 2-20 h.

Preferably, the metal salt containing the element N in step (a) is at least one selected from the group consisting of sulphate, nitrate, chloride, acetate and citrate.

Preferably, the sodium salt in step (b) is at least one selected from the group consisting of sodium sulfate, sodium nitrate, sodium chloride, sodium acetate and sodium citrate.

Preferably, the second lithium salt and the third lithium salt are each independently at least one selected from the group consisting of lithium nitrate, lithium chloride, lithium hydroxide and lithium carbonate.

Preferably, the third doping agent refers to at least one of an oxide, a phosphate, a fluoride and a carbonate containing the element N'.

Preferably, the second complexing agent is at least one selected from the group consisting of ammonia, salicylic acid, ammonium sulphate and ammonium chloride.

Preferably, the second precipitant is at least one selected from the group consisting of sodium hydroxide, potassium hydroxide, sodium carbonate and potassium carbonate.

Preferably, the second complexing agent and the second precipitant in step (a) are used in amounts such that a pH of the system is 7-12 during a process of performing the fourth mixing.

Preferably in step (b), a molar ratio of the used amount of the coating layer precursor calculated in terms of the molar total of the N element and the N' element contained therein to the used amount of the sodium salt calculated in terms of the sodium element contained therein is 1:0.8-1.4.

Preferably in step (b), a molar ratio of the used amount of the coating layer precursor calculated in terms of the molar total of the N element and the N' element contained therein to the used amount of the second lithium salt calculated in terms of the lithium element contained therein is 1:0.1-0.5.

According to another preferred embodiment of the present disclosure, the method according to the second aspect of the present disclosure comprises the following steps:

S1: subjecting the ingredients of the component C to a second mixing, in the presence of a first solvent, so as to obtain a matrix precursor, wherein the component C comprises a first complexing agent, a first precipitant and a manganese salt, and optionally comprises at least one of a cobalt salt, a nickel salt and a first doping agent, wherein the first doping agent contains the element M;

S2: subjecting the matrix precursor and the ingredients of the component D to a third mixing to obtain a matrix substance A, wherein the component D comprises a first lithium salt, and optionally further comprises a second doping agent, wherein the second doping agent contains the element M;

S3: subjecting the ingredients of the component E to a fourth mixing, in the presence of a second solvent, so as to obtain a coating layer precursor, wherein the component E comprises a second complexing agent, a second precipitant and a metal salt containing the element N, and optionally further comprises a third doping agent, wherein the third doping agent contains the element N';

S4: subjecting the coating layer precursor, a second lithium salt and a sodium salt to a fifth mixing to obtain a coating layer intermediate product;

S5: subjecting the coating layer intermediate product and a third lithium salt to a sixth mixing, so as to prepare a coating layer substance B;

S6: subjecting the matrix substance A and the coating layer substance B to a first mixing to prepare a lithium-manganese rich material.

The method according to a second aspect of the present disclosure further comprises a post-treatment means generally known in the art, such as suction filtration, washing, drying, crushing and sieving, the present disclosure will not give unnecessary details herein, the content shall not construed by those skilled in the art as limitation to the present disclosure.

As previously mentioned, a third aspect of the present disclosure provides a lithium-manganese rich material prepared by the method of the aforesaid second aspect.

As previously mentioned, a fourth aspect of the present disclosure provides a use of the aforesaid lithium-manganese rich material in a lithium ion battery.

The present disclosure will be described below in detail with reference to examples.

Unless otherwise specified, all the raw materials in the following examples are commercially available.

Unless otherwise specified in the present disclosure, room temperature refers to 25±2° C.

In the following examples, the associated properties were obtained by means of the following approaches:

(1) Phase test: measured with an X-ray diffractometer with a model SmartLab 9 kw manufactured by the Rigaku Corporation in Japan;

(2) Morphology test: measured with a scanning electron microscope with a model S-4800 manufactured by the Hitachi corporation in Japan;

(3) Median particle diameter $D_{50}$: measured with a laser particle analyzer with a model Hydro 2000mu manufactured by the Marvern company;

(4) Specific surface area: measured with a specific surface tester with a model Tristar II3020 manufactured by the Micromeritics Instrument Corporation in the Unites States of America (USA);

(5) Tap density: measured with a tap density tester with a model BT-30 manufactured by the Baxter company;

(6) Electrochemical Performance Testing:
the electrochemical performance of the lithium-manganese rich material prepared below were obtained by a testing of the 2025 type button cell.

The preparation process of the 2025 type button cell comprised the following steps:

preparation of a pole piece: the lithium-manganese rich material, carbon black and polyvinylidene fluoride in a mass ratio of 80:10:10 were mixed with a proper amount of N-methylpyrrolidone fully to form a uniform slurry, which was coated on an aluminum foil, the aluminum foil was subjected to drying at 120° C., rolling, and punching shear, such that a positive pole piece with a diameter of 11 mm was manufactured, the load amount of the lithium-manganese rich material was about 7 mg/cm$^2$.

Battery assembly: a 2025 type button cell was assembled in a glove box filled with argon gas, using a lithium sheet as the negative electrode, a polypropylene microporous membrane as the membrane separator (Celgard 2400), and 1M of LiPF$_6$/EC+DMC as the electrolyte.

Electrochemical Performance Test:

The button cell was subjected to an electrochemical performance test by using the Neware Cell Test System at 25° C., wherein the charge-discharge current density of 1 C was 250 mA/g:

a. the prepared button cell was subjected to a charge and discharge test at 2.0-4.6V and 0.1 C, the first charge-discharge specific capacity and the initial coulombic efficiency of the material were evaluated;

b. the prepared button cell was subjected to 100 charge-discharge cycles at 2.0-4.6V and 0.2 C, the cycle stability and the voltage decay of the material were evaluated;

c. the prepared button cell was subjected to charge-discharge tests at 2.0-4.6V and 0.1 C, 0.2 C, 0.5 C and 1 C respectively, the rate capability of the material was evaluated.

Example 1

S1: Manganese sulfate, nickel sulfate and cobalt sulfate were dissolved according to a molar ratio 4:1:1 in terms of element manganese, cobalt and nickel to obtain a mixed salt solution with a concentration of 2 mol/L, sodium carbonate was dissolved into a precipitant solution with a concentration of 2 mol/L; ammonia water was diluted into a complexing agent solution with a concentration of 3 mol/L. The precipitant solution, the complexing agent solution and 100 L of the mixed salt solution were added into a reactor in a cocurrent manner, a second mixing was performed for 20 h at the temperature of 45° C., a pH of 8.5 and a stirring speed of 700 rpm, the precursor slurry was then subjected to suction filtration and washing, a filter cake was subjected to drying at the temperature of 105° C. and sieving so as to obtain a matrix precursor;

S2: lithium carbonate, and the matrix precursor prepared in S1 were uniformly mixed according to a molar ratio of Li/(Ni+Co+Mn)=1.5:1, and the mixture was heated to 450° C. from room temperature in an air atmosphere, the heat preservation was performed for 4 h, the temperature was further raised to 850° C., the heat preservation was performed for 10 h to carry out a third mixing, the product was subjected to crushing and sieving to obtain a matrix substance A;

S3: the manganese sulphate, nickel sulphate and cobalt sulphate were dissolved according to a molar ratio 4:1:1 in terms of elements manganese, cobalt and nickel to obtain a mixed salt solution with a concentration of 2 mol/L, sodium carbonate was dissolved into a precipitant solution with a concentration of 2 mol/L; ammonia water was diluted into a complexing agent solution with a concentration of 3 mol/L. 100 L of the mixed salt solution, the precipitant solution and the complexing agent solution were added into the reaction vessel in a cocurrent manner, a fourth mixing was performed for 10 h at a temperature of 45° C., a pH of 8.5 and a stirring speed of 700 rpm, the precursor slurry was then subjected to suction filtration and washing, a filter cake was subjected to drying at the temperature of 105° C. and sieving so as to obtain a coating layer precursor;

S4: sodium carbonate, lithium carbonate and the coating layer precursor prepared in S3 were subjected to a fifth mixing according to a molar ratio of Na/(Ni+Co+Mn)=1.04:1 and a molar ratio of Li/(Ni+Co+Mn)=0.25:1, the mixture was heated to 800° C. from room temperature in an air atmosphere, the heat preservation was performed for 10 h, the product was subjected to natural cooling, crushing and sieving to obtain a coating layer intermediate product;

S5: a mixture of lithium nitrate and lithium chloride (a molar ratio of lithium nitrate and lithium chloride=1:4), and the coating layer intermediate product prepared in S4 were subjected to a sixth mixing according to a molar ratio 1.2 of the element Li in the lithium salt mixture relative to the element Na in the coating layer intermediate product, the mixture was heated to 400° C. from room temperature in an air atmosphere, the heat preservation was performed for 5 h, the product was subjected to natural cooling, sufficient crushing and sieving to obtain a coating layer substance B;

S6: the coating layer substance B prepared in S5 and the matrix substance A prepared in S2 were subjected to a first mixing according to a mass ratio of 1:100, the mixture was heated to 450° C. from room temperature in an air atmosphere, the heat preservation was performed for 10 h, the product was subjected to natural cooling, so as to prepare a lithium-manganese rich material.

Examples 2-10

The lithium-manganese rich materials were produce with a method similar to that in Example 1, except that the different formulas or process parameters were adopted in the preparation method, the rest was the same as that in Example 1, the lithium-manganese rich materials were prepared.

TABLE 1

| | Example 1 | Example 2 | Example 3 | Example 4 | Example 5 | Example 6 | Example 7 |
|---|---|---|---|---|---|---|---|
| S1 Mixed salt solution (100 L) | | | | | | | |
| Species | Manganese sulphate, nickel sulphate, cobalt sulphate | Manganese sulphate, nickel sulphate, cobalt sulphate | Manganese sulphate, nickel sulphate, cobalt sulphate | Manganese chloride, nickel chloride | Manganese nitrate, nickel nitrate, cobalt nitrate | Manganese sulphate, cobalt sulphate | Manganese sulphate, nickel sulphate, cobalt sulphate |
| Ratio | 4:1:1 | 7:2:1 | 13:5:2 | 3:1 | 4:1:1 | 4:1 | 4:1:1 |
| Concentration | 2 mol/L | 2 mol/L | 2 mol/L | 1 mol/L | 1 mol/L | 1 mol/L | 3 mol/L |
| First precipitating agent | Sodium carbonate | Sodium carbonate | Potassium carbonate | Sodium hydroxide | Sodium carbonate | Potassium carbonate | Sodium hydroxide |
| First complexing agent | Ammonia water | Ammonia water | Ammonia water | Ammonia water | Ammonia water | / | Ammonia water |
| First doping agent | | | | | | | |
| Species | / | / | / | / | Zirconium nitrate | Aluminum chloride | Strontium hydroxide, lanthanum chloride |
| Ratio | / | / | / | / | / | / | 2:1 |
| Ratio of used amounts | / | / | / | / | Zr/(Ni + Co + Mn) = 0.05:1 | Al/(Co + Mn) = 0.1:1 | Sr/(Ni + Co + Mn) = 0.02:1 La/(Ni + Co + Mn) = 0.01:1 |
| S2 First lithium salt | | | | | | | |
| Species | Lithium carbonate | Lithium carbonate | Lithium carbonate | Lithium carbonate | Lithium carbonate | Lithium carbonate | Lithium carbonate |
| Ratio | / | / | / | / | / | / | / |
| Ratio of used amounts | Li/(Ni + Co + Mn) = 1.5:1 | Li/(Ni + Co + Mn) = 1.3:1 | Li/(Ni + Co + Mn) = 1.8:1 | Li/(Ni + Mn) = 1.2:1 | Li/(Ni + Mn + Co + Zr) = 1.55:1 | Li/(Mn + Co + Al) = 1.6:1 | Li/(Ni + Mn + Co + La + Sr) = 1.57:1 |

TABLE 1-continued

| | | | | | Second doping agent | | |
|---|---|---|---|---|---|---|---|
| Species | / | / | / | / | Titania | Niobium pentoxide | Discandium trioxide |
| Ratio | / | / | / | / | / | / | / |
| Ratio of used amounts | / | / | / | / | Ti/(Ni + Mn + Co + Zr) = 0.02:1 | Nb/(Mn + Co + Al) = 0.03:1 | Sc/(Ni + Mn + Co + La + Sr) = 0.01:1 |

S3
Metal salt solution (100 L)

| | | | | | | | |
|---|---|---|---|---|---|---|---|
| Species | Manganese sulphate, nickel sulphate, cobalt sulphate | Manganese sulphate, nickel sulphate, cobalt sulphate | Manganese sulphate, nickel sulphate, cobalt sulphate | Manganese chloride, nickel chloride, cobalt chloride | Manganese chloride, nickel chloride, cobalt chloride | Ruthenium chloride, cobalt chloride | Manganese sulphate, cobalt sulphate |
| Ratio | 4:1:1 | 7:2:1 | 13:5:2 | 4:1:1 | 4:1:1 | 3:1 | 3:1 |
| Concentration | 2 mol/L | 2 mol/L | 2 mol/L | 1 mol/L | 1 mol/L | 1 mol/L | 1 mol/L |
| First precipitating agent | Sodium carbonate | Sodium carbonate | Potassium hydroxide | Sodium carbonate | Sodium carbonate | Potassium carbonate | Potassium carbonate |
| First complexing agent | Ammonia water | Ammonia water | Ammonia water | Ammonia water | Ammonia water | / | Ammonia water |

Third doping agent

| | | | | | | | |
|---|---|---|---|---|---|---|---|
| Species | / | / | / | / | / | Boric acid | Zinc sulfate |
| Ratio | / | / | / | / | / | / | / |
| Ratio of used amounts | / | / | / | / | / | B/(Ru + Co) = 0.05:1 | Zn/(Mn + Co) = 0.03:1 |

S4
Second lithium salt

| | | | | | | | |
|---|---|---|---|---|---|---|---|
| Species | Lithium carbonate | Lithium carbonate | Lithium carbonate | Lithium carbonate | Lithium carbonate | Lithium carbonate | Lithium carbonate |
| Ratio | / | / | / | / | / | / | / |
| Ratio of used amounts | Li/(Ni + Co + Mn) = 0.25:1 | Li/(Ni + Co + Mn) = 0.45:1 | Li/(Ni + Co + Mn) = 0.1:1 | Li/(Ni + Co + Mn) = 0.5:1 | Li/(Ni + Co + Mn) = 0.25:1 | Li/(Ru + Co + B) = 0.2:1 | Li/(Mn + Co + Zn) = 0.3:1 |

Sodium salt

| | | | | | | | |
|---|---|---|---|---|---|---|---|
| Species | Sodium carbonate | Sodium carbonate | Sodium carbonate | Sodium carbonate | Sodium carbonate | Sodium carbonate | Sodium carbonate |
| Ratio | / | / | / | / | / | / | / |
| Ratio of used amounts | Na/(Ni + Co + Mn) = 1.04:1 | Na/(Ni + Co + Mn) = 1.2:1 | Na/(Ni + Co + Mn) = 1.4:1 | Na/(Ni + Co + Mn) = 1.04:1 | Na/(Ni + Co + Mn) = 1.1:1 | Na/(Ru + Co + B) = 0.95:1 | Na/(Mn + Co + Zn) = 1.48:1 |

S5
Third lithium salt

| | | | | | | | |
|---|---|---|---|---|---|---|---|
| Species | Lithium nitrate, lithium chloride | Lithium nitrate, lithium chloride | Lithium hydroxide, lithium chloride | Lithium chloride | Lithium chloride, lithium carbonate | Lithium chloride, lithium hydroxide | Lithium chloride, lithium hydroxide |
| Ratio | 1:4 | 4:1 | 1:1 | / | 4:1 | 3:2 | 4:1 |
| Ratio of used amounts of Li:Na | 1.2:1 | 1:1 | 1.2:1 | 1.2:1 | 1.5:1 | 1.2:1 | 1.1:1 |

S6
First mixing ratio

| | | | | | | | |
|---|---|---|---|---|---|---|---|
| A:B (weight ratio) | 100:1 | 100:5 | 100:0.01 | 100:10 | 100:3 | 100:0.05 | 100:0.02 |

Preparation process
Second mixing

| | | | | | | | |
|---|---|---|---|---|---|---|---|
| Temperature | 45° C. | 45° C. | 50° C. | 60° C. | 20° C. | 40° C. | 35° C. |
| Time | 20 h | 20 h | 30 h | 10 h | 15 h | 12 h | 8 h |
| Rotational speed | 700 rpm | 700 rpm | 700 rpm | 1000 rpm | 300 rpm | 500 rpm | 1000 rpm |
| pH | 8.5 | 8.5 | 8.5 | 12 | 8 | 10 | 12 |

TABLE 1-continued

Third mixing

| | | | | | | | |
|---|---|---|---|---|---|---|---|
| Temperature of the first condition | 450° C. | 300° C. | 500° C. | 600° C. | 500° C. | 800° C. | 300° C. |
| Time of the first condition | 4 h | 6 h | 2 h | 1 h | 4 h | 15 h | 6 h |
| Temperature of the second condition | 850° C. | 700° C. | 900° C. | 1000° C. | 900° C. | / | 900° C. |
| Time of the second condition | 10 h | 15 h | 6 h | 4 h | 10 h | / | 16 h |

Fourth mixing

| | | | | | | | |
|---|---|---|---|---|---|---|---|
| Temperature | 45° C. | 20° C. | 50° C. | 50° C. | 50° C. | 45° C. | 45° C. |
| Time | 10 h | 5 h | 15 h | 5 h | 5 h | 5 h | 5 h |
| Rotational speed | 700 rpm | 700 rpm | 700 rpm | 1000 rpm | 1000 rpm | 1000 rpm | 1000 rpm |
| pH | 8.5 | 8.5 | 11.5 | 8.5 | 8.5 | 8.5 | 8.5 |

Fifth mixing

| | | | | | | | |
|---|---|---|---|---|---|---|---|
| Temperature | 800° C. | 850° C. | 600° C. | 1000° C. | 900° C. | 850° C. | 900° C. |
| Time | 10 h | 8 h | 20 h | 4 h | 4 h | 15 h | 12 h |

Sixth mixing

| | | | | | | | |
|---|---|---|---|---|---|---|---|
| Temperature | 400° C. | 700° C. | 300° C. | 500° C. | 400° C. | 500° C. | 400° C. |
| Time | 5 h | 2 h | 20 h | 10 h | 12 h | 10 h | 10 h |

First mixing

| | | | | | | | |
|---|---|---|---|---|---|---|---|
| Temperature | 450° C. | 400° C. | 300° C. | 800° C. | 800° C. | 900° C. | 850° C. |
| Time | 10 h | 15 h | 12 h | 2 h | 2 h | 5 h | 6 h |

| | Example 8 | Example 9 | Example 10 |
|---|---|---|---|
| S1 | | | |
| Mixed salt solution (100 L) | | | |
| Species | Manganese sulphate, nickel sulphate, cobalt sulphate | Manganese sulphate, nickel sulphate, cobalt sulphate | Manganese sulphate, nickel sulphate, cobalt sulphate |
| Ratio | 7:2:1 | 7:2:1 | 7:2:1 |
| Concentration | 2 mol/L | 2 mol/L | 2 mol/L |
| First precipitating agent | Sodium carbonate | Sodium carbonate | Potassium carbonate |
| First complexing agent | Ammonia water | Ammonia water | Ammonia water |
| First doping agent | | | |
| Species | Titanium chloride | Cerium chloride | / |
| Ratio | / | / | / |
| Ratio of used amounts | Ti/(Ni + Co + Mn) = 0.02:1 | Ce/(Ni + Co + Mn) = 0.02:1 | / |
| S2 | | | |
| First lithium salt | | | |
| Species | Lithium carbonate | Lithium carbonate | Lithium carbonate |
| Ratio | / | / | / |
| Ratio of used amounts | Li/(Ni + Co + Mn + Ti) = 1.5:1 | Li/(Ni + Co + Mn + Ce) = 1.5:1 | Li/(Ni + Co + Mn) = 1.6:1 |
| Second doping agent | | | |
| Species | Vanadium pentoxide | Tungsten oxide | Yttrium(III) oxide |
| Ratio | / | / | / |
| Ratio of used amounts | V/(Ni + Mn + Co + Ti) = 0.02:1 | W/(Ni + Mn + Co + Ce) = 0.02:1 | Y/(Ni + Mn + Co) = 0.02:1 |

TABLE 1-continued

| | S3<br>Metal salt solution (100 L) | | |
|---|---|---|---|
| Species | Manganese sulphate, nickel sulphate, cobalt sulphate | Manganese sulphate, nickel sulphate, cobalt sulphate | Manganese sulphate, nickel sulphate, cobalt sulphate |
| Ratio | 4:1:1 | 4:1:1 | 4:1:1 |
| Concentration | 2 mol/L | 2 mol/L | 2 mol/L |
| First precipitating agent | Sodium carbonate | Sodium carbonate | Sodium carbonate |
| First complexing agent | Ammonia water | Ammonia water | Ammonia water |
| | Third doping agent | | |
| Species | Aluminum sulfate | Ammonium niobium oxalate | Tungstic acid |
| Ratio | / | / | / |
| Ratio of used amounts | Al/(Mn + Co + Ni) = 0.02:1 | Nb/(Mn + Co + Ni) = 0.02:1 | W/(Mn + Co + Ni) = 0.02:1 |
| | S4<br>Second lithium salt | | |
| Species | Lithium carbonate | Lithium carbonate | Lithium carbonate |
| Ratio | / | / | / |
| Ratio of used amounts | Li/(Ni + Co + Mn + Al) = 0.25:1 | Li/(Ni + Co + Mn + Nb) = 0.25:1 | Li/(Ni + Co + Mn + W) = 0.25:1 |
| Sodium salt | | | |
| Species | Sodium carbonate | Sodium carbonate | Sodium carbonate |
| Ratio | / | / | / |
| Ratio of used amounts | Na/(Ni + Co + Mn) = 1.2:1 | Na/(Ni + Co + Mn) = 1.2:1 | Na/(Ni + Co + Mn) = 1.2:1 |
| | S5<br>Third lithium salt | | |
| Species | Lithium nitrate, lithium chloride | Lithium nitrate, lithium chloride | Lithium nitrate, lithium chloride |
| Ratio | 1:4 | 1:5 | 1:4 |
| Ratio of used amounts of Li:Na | 1.45:1 | 1.52:1 | 1.45:1 |
| | S6<br>First mixing ratio | | |
| A:B (weight ratio) | 100:2 | 100:2 | 100:2 |
| | Preparation process<br>Second mixing | | |
| Temperature | 45° C. | 45° C. | 50° C. |
| Time | 20 h | 20 h | 30 h |
| Rotational speed | 700 rpm | 700 rpm | 700 rpm |
| pH | 8.5 | 8.5 | 8.5 |
| | Third mixing | | |
| Temperature of the first condition | 450° C. | 450° C. | 450° C. |
| Time of the first condition | 5 h | 5 h | 5 h |
| Temperature of the second condition | 850° C. | 850° C. | 900° C. |
| Time of the second condition | 10 h | 10 h | 10 h |

TABLE 1-continued

| | Fourth mixing | | |
|---|---|---|---|
| Temperature | 45° C. | 30° C. | 50° C. |
| Time | 10 h | 5 h | 15 h |
| Rotational speed | 700 rpm | 700 rpm | 700 rpm |
| pH | 8.5 | 8.5 | 8.5 |
| | Fifth mixing | | |
| Temperature | 800° C. | 800° C. | 800° C. |
| Time | 10 h | 10 h | 10 h |
| | Sixth mixing | | |
| Temperature | 300° C. | 300° C. | 300° C. |
| Time | 10 h | 10 h | 10 h |
| | First mixing | | |
| Temperature | 450° C. | 450° C. | 450° C. |
| Time | 15 h | 15 h | 15 h |

Unless otherwise specified, each of the ratios and the used amount ratios in Table 1 refers to a molar ratio.

Comparative Example 1

The same steps S1, S2 were used as those in Example 1, such that the matrix substance A was prepared.

Comparative Example 2

The same steps S3, S4 and S5 were used as those in Example 1, such that the coating layer substance B was prepared.

Comparative Example 3

The preparation was performed with a similar manner as that in Example 1, except that in step (6), the coating layer substance B and the matrix substance A were mixed according to a mass ratio of 15:100, such that a lithium-manganese rich material was prepared.

The compositions of the materials prepared in the above Examples were shown in Table 2.

Test Example
(1) XRD Test

The present disclosure tested XRD of the lithium-manganese rich materials prepared in the above-mentioned Examples, and exemplarily provided XRD test results of Example 1 and Comparative Examples 1-2, as shown in FIG. 1, it can be seen from the XRD of FIG. 1 that the first peak position of Comparative Example 1 was about 18.7°, and a characteristic peak of a lithium-rich material appeared at 20-25°, the arrangement of oxygen atomic layers in the unit cell of the lithium-manganese rich material of the structure was ABCABC arrangement, the biggest problem of the structure was instability during the cyclic process, resulting in severe voltage decay; it can be seen from the XRD of FIG. 1 that the first peak position of Comparative Example 2 was about 18.2°, the other peaks had weaker intensity than the first peak, the arrangement of oxygen atom layers in the structural unit cell was ABACABAC arrangement; it can be seen from the XRD of FIG. 1, Example 1 had a splitting peak between 18-19°, which indicated that the lithium-manganese rich material provided by the present disclosure was a biphasic composite structure consisting of the matrix substance A and the coating layer substance B.

(2) Morphology Test

Figure 2:
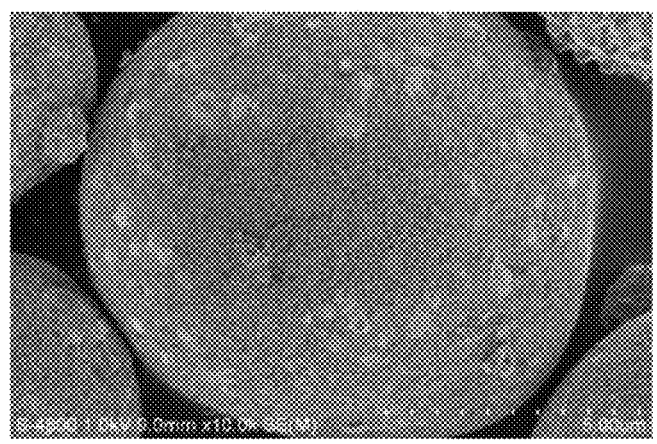
FIG. 2 illustrates a Scanning Electron Microscope (SEM) photograph of the lithium-manganese rich material prepared in Example 1.
Figure 3:
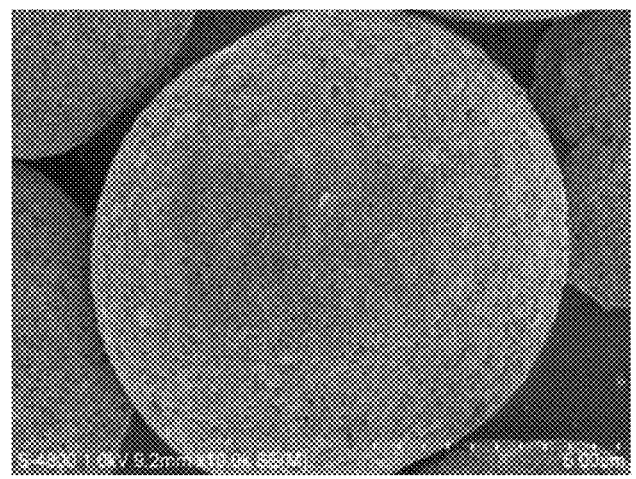
FIG. 3 illustrates a Scanning Electron Microscope (SEM) photograph of the matrix substance A prepared in Comparative Example 1.

The present disclosure tested the scanning electron microscope (SEM) images of the lithium-manganese rich material prepared in the above-mentioned examples, and exemplarily provided SEM images of Example 1 and Comparative Example 1, the results were respectively shown in FIG. 2 and FIG. 3, it can be seen from comparing FIG. 2 with FIG. 3, that in FIG. 2, the lithium-manganese rich material provided by the present disclosure, the coating material B successfully coated the matrix substance A; and as illustrated by FIG. 3 that the matrix substance A was a secondary spherical structure formed by primary particles.

(3) Physical Property Measurement

The present disclosure tested the median particle diameter $D_{50}$, tap density and specific surface area of the lithium-manganese rich materials prepared in the above-mentioned Example, the specific results were shown in Table 3.

TABLE 2

| | Chemical formula of matrix | Chemical formula of coating layer | Content ratio by weight (matrix:coating layer) |
|---|---|---|---|
| Example 1 | $Li_{1.2}[(Mn_{0.667}Co_{0.167}Ni_{0.167})_{0.8}]O_2$ | $Li(Li_{0.2}Mn_{0.534}Co_{0.133}Ni_{0.133})O_2$ | 100:1 |
| Example 2 | $Li_{1.13}[(Mn_{0.7}Co_{0.1}Ni_{0.2})_{0.87}]O_2$ | $Li_{1.1}(Li_{0.2308}Mn_{0.5385}Co_{0.0769}Ni_{0.1538})O_2$ | 100:5 |
| Example 3 | $Li_{1.29}[(Mn_{0.65}Co_{0.1}Ni_{0.25})_{0.71}]O_2$ | $Li_{1.2}(Li_{0.2481}Mn_{0.4887}Co_{0.0752}Ni_{0.188})O_2$ | 100:0.01 |
| Example 4 | $Li_{1.09}[(Mn_{0.75}Ni_{0.25})_{0.91}]O_2$ | $Li(Li_{0.186}Mn_{0.542}Co_{0.136}Ni_{0.136})O_2$ | 100:10 |
| Example 5 | $Li_{1.21}[(Mn_{0.634}Co_{0.158}Ni_{0.158}Zr_{0.05})_{0.785}Ti_{0.016}]O_2$ | $Li_{0.95}(Li_{0.3}Mn_{0.466}Co_{0.117}Ni_{0.117})O_2$ | 100:3 |
| Example 6 | $Li_{1.22}[(Mn_{0.72}Co_{0.18}Al_{0.1})_{0.762}Nb_{0.023}]O_2$ | $Li_{0.85}(Li_{0.4}Ru_{0.4272}Co_{0.1427}B_{0.0301})O_2$ | 100:0.05 |
| Example 7 | $Li_{1.22}[(Mn_{0.646}Co_{0.162}Ni_{0.162}La_{0.01}Sr_{0.02})_{0.776}Sc_{0.008}]O_2$ | $Li_{0.8}(Li_{0.1}Mn_{0.647}Co_{0.226}Zn_{0.027})O_2$ | 100:0.02 |
| Example 8 | $Li_{1.2}[(Mn_{0.686}Co_{0.098}Ni_{0.196}Ti_{0.02})_{0.784}V_{0.016}]O_2$ | $Li(Li_{0.25}Mn_{0.491}Co_{0.122}Ni_{0.122}Al_{0.015})O_2$ | 100:2 |
| Example 9 | $Li_{1.19}[(Mn_{0.686}Co_{0.098}Ni_{0.196}Ce_{0.02})_{0.794}W_{0.016}]O_2$ | $Li_{1.05}(Li_{0.25}Mn_{0.491}Co_{0.122}Ni_{0.122}Nb_{0.015})O_2$ | 100:2 |
| Example 10 | $Li_{1.237}[(Mn_{0.7}Co_{0.1}Ni_{0.2})_{0.748}Y_{0.015}]O_2$ | $Li(Li_{0.25}Mn_{0.491}Co_{0.122}Ni_{0.122}W_{0.015})O_2$ | 100:2 |

TABLE 3

| Source of samples | Median particle diameter $D_{50}$/μm | Tap density/g/cm$^3$ | Specific surface area/m$^2$/g |
|---|---|---|---|
| Example 1 | 11.9 | 1.80 | 6.3 |
| Example 2 | 12.5 | 1.90 | 3.2 |
| Example 3 | 11.1 | 1.76 | 6.1 |
| Example 4 | 13.3 | 1.91 | 2.8 |
| Example 5 | 14.5 | 1.85 | 3.1 |
| Example 6 | 12.0 | 1.81 | 4.2 |
| Example 7 | 11.5 | 1.88 | 4.5 |
| Example 8 | 11.6 | 1.75 | 6.1 |
| Example 9 | 12.0 | 1.83 | 4.5 |
| Example 10 | 12.5 | 1.88 | 4.0 |
| Comparative Example 1 | 10.1 | 1.7 | 7.7 |
| Comparative Example 2 | 5.2 | 1.6 | 12.8 |
| Comparative Example 3 | 12.5 | 1.8 | 5.8 |

As can be seen from the results in Table 2, the lithium-manganese rich materials provided by the present disclosure had a higher tap density and a lower specific surface area than the matrix material A and the coating layer material B thereof.

(4) Electrochemical Performance Test

The present disclosure tested the electrochemical properties of the materials prepared by the above-mentioned Examples, including a first charge-discharge specific capacity, an initial coulombic efficiency, a cycle stability and a rate capability, the specific test results were shown in Table 4.

TABLE 4

| Source of samples | First charge specific capacity (mAh/g) | First discharge specific capacity (mAh/g) | Initial charge-discharge efficiency (%) | Capacity retention rate after circulation for 100 cycles (%) | Average voltage drop (mV) |
|---|---|---|---|---|---|
| Example 1 | 306 | 289 | 94.0 | 92.3 | 170 |
| Example 2 | 319 | 275 | 86.2 | 90.0 | 150 |
| Example 3 | 322 | 298 | 92.5 | 88.2 | 198 |
| Example 4 | 320 | 266 | 83.1 | 93.8 | 142 |
| Example 5 | 310 | 295 | 95.2 | 88.0 | 147 |
| Example 6 | 321 | 282 | 87.9 | 93.3 | 160 |
| Example 7 | 312 | 285 | 91.3 | 93.8 | 158 |
| Example 8 | 326 | 298 | 91.4 | 91.2 | 156 |
| Example 9 | 315 | 280 | 88.9 | 93.5 | 162 |
| Example 10 | 320 | 288 | 90.0 | 89.1 | 166 |
| Comparative Example 1 | 294 | 253 | 86 | 68.0 | 320 |
| Comparative Example 2 | 334 | 254 | 76 | 92.8 | 148 |
| Comparative Example 3 | 325 | 264 | 81 | 81.0 | 183 |

As can be seen from the comparison results of Example 1 and Comparative Example 1, compared with the matrix material A prepared in Comparative Example 1, the lithium-manganese rich material provided by the present disclosure has the advantages that the discharge specific capacity at 0.1 C is increased by 36 mAh/g, the initial coulombic efficiency is improved by 8%, the capacity retention rate after circulation 100 cycles is enhanced by 24.3%, and the average voltage decay is reduced by 150 mV, thus the performance of the matrix material A in the prior art is obviously improved by the lithium-manganese rich material provided by the present disclosure.

As can be seen from the comparison results of Example 1 and Comparative Example 2, compared with the coating layer material B prepared in Comparative Example 2, the lithium-manganese rich material provided by the present disclosure has the advantages that the discharge specific capacity at 0.1 C is increased by 35 mAh/g, the initial coulombic efficiency is improved by 18%, thus the performance of the coating layer material B in the prior art is obviously improved by the lithium-manganese rich material provided by the present disclosure.

Figure 4:
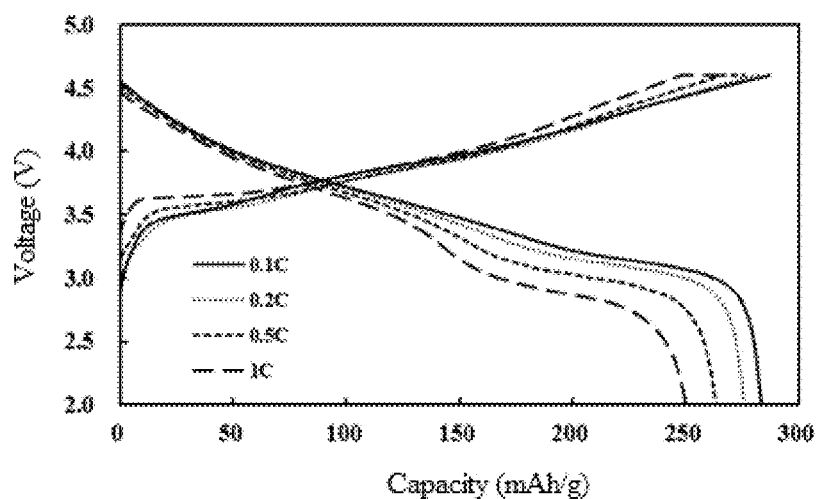
FIG. 4 illustrates a graph showing rate capability test results of a lithium-manganese rich material prepared in Example 1.

The present disclosure exemplarily provides a test result chart illustrating the rate capability test of the lithium-manganese rich material prepared in Example 1, as shown in FIG. 4, it can be seen from FIG. 4 that the lithium-manganese rich material provided by the present disclosure exhibits excellent rate capability.

Figure 5:
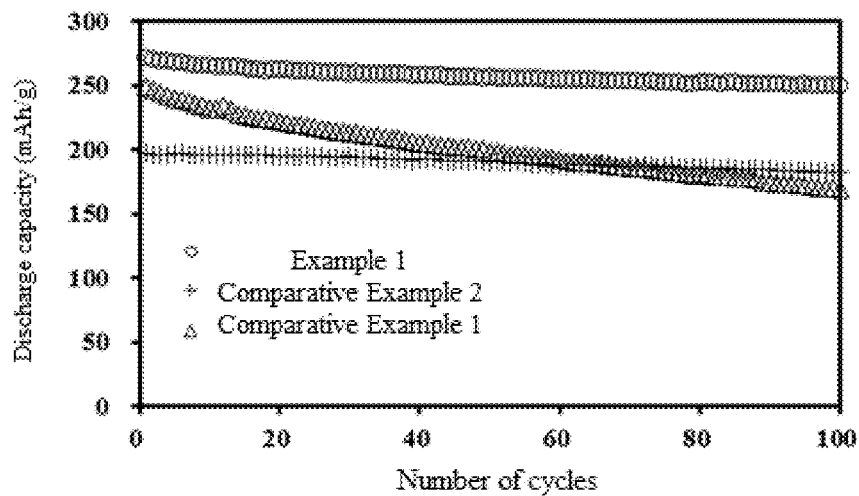
FIG. 5 illustrates a graph showing the cyclic performance test for the materials prepared in Example 1 and Comparative Examples 1-2.

The present disclosure exemplarily provides a chart illustrating the cycle stability test results of the materials prepared in Example 1 and Comparative Examples 1-2, as shown in FIG. 5; it can be seen from FIG. 5 that the lithium-manganese rich material provided by the present disclosure exhibits excellent cycle stability; in addition, the lithium-manganese rich material provided by the present disclosure has higher discharge specific capacity than the materials of the Comparative Example 1 and the Comparative Example 2 alone.

Figure 6:
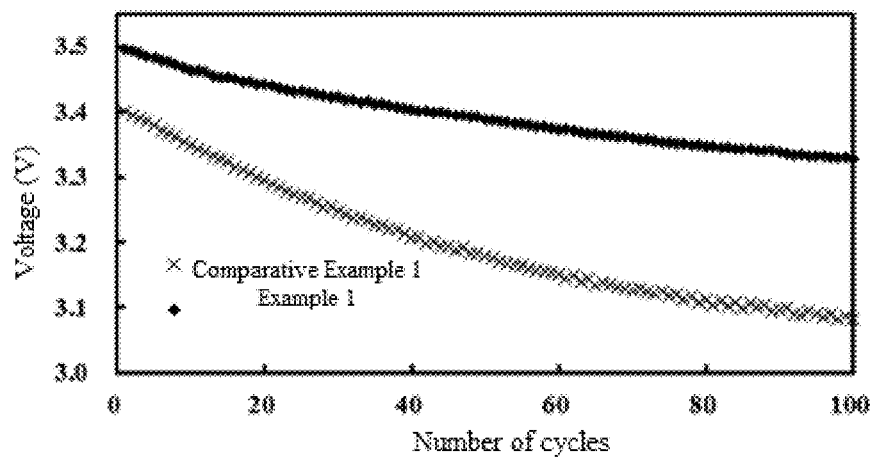
FIG. 6 illustrates a graph showing the average voltage of the materials prepared in Example 1 and Comparative Example 1 during the cyclic process.

The present disclosure exemplarily provides a graph illustrating an average voltage of the materials prepared in Example 1 and Comparative Example 1 during the cyclic process, as shown in FIG. 6; it can be seen from FIG. 6 that an average voltage decay of the lithium-rich mechanical-based material provided by the present disclosure after 100 cycles is 170 mV, an average voltage drop of the matrix substance A of Comparative Example 1 after 100 cycles is 320 mV, further demonstrating that the lithium-manganese rich material provided by the present disclosure has excellent cycle performance and structural stability.

The results show that the lithium-rich manganese-based cathode material provided by the present disclosure has a high charge-discharge specific capacity, high performance of the initial coulombic efficiency, excellent rate capability and cycle stability. Particularly, the comprehensive performance of the lithium-manganese rich material provided by the present disclosure is further improved compared with that of the matrix material A and the coating layer material B which are used alone.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A lithium-manganese rich material consisting of;
a matrix that contains a first substance represented by a chemical formula Li1.2+x[(Mn1-a-b-cCoaNibMc)1-dM'd]0.8-xO2, wherein $-0.11 \leq x \leq 0.3$, $0 \leq a \leq 0.3$, $0 \leq b \leq 0.3$, $0 \leq c \leq 0.1$, $0 \leq d \leq 0.1$, M and M' are respectively and independently at least one element selected from a group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr; and
a coating layer on a surface of the matrix, wherein the coating layer contains a second substance represented by a chemical formula Liu (Li1-v-γNvN'γ)O2, wherein $0.8 \leq u < 1.2$, $0.6 \leq v \leq 0.9$, $0 \leq \gamma < 0.1$, N is at least one element selected from the group consisting of Mn, Co, Ni, Fe, Ru and Mo; N' is at least one element selected from the group consisting of Al, B, Ba, Ce, Cr, Co, Cu, Fe, K, La, Mg, Mn, Mo, Na, Nb, Ni, Os, Pr, Re, Ru, Sc, Sr, Sm, Ta, Ti, V, W, Y, Yb, Zn and Zr; the element N and the element N' are different;
wherein a content ratio by weight of the matrix to the coating layer in the material is 100:0.01-10.

2. The lithium-manganese material of claim 1, wherein the material has a median particle diameter D50 of 6-20 μm.

3. The lithium-manganese material of claim 1, wherein the material has a specific surface area of 2-7.5 m2/g.

4. A method of preparing the lithium-manganese rich material of claim 1, the method comprising:
subjecting the first substance and the second substance to a first mixing to obtain a lithium-manganese rich material.

5. The method of claim 4, wherein the first mixing is performed in an oxygen-containing atmosphere, the conditions of the first mixing comprise: a temperature of 300-1,000° C. and a time of 2-15 h.

6. The method of claim 4, wherein the method further comprises the following steps to prepare the first substance:
(1) subjecting the ingredients of component C to a second mixing, in the presence of a first solvent, so as to obtain a matrix precursor, wherein the component C comprises a first complexing agent, a first precipitating agent and a manganese salt, and optionally comprises at least one of a cobalt salt, a nickel salt and a first doping agent, wherein the first doping agent contains the element M;
(2) subjecting the matrix precursor and the ingredients of component D to a third mixing to obtain the first substance, wherein the component D comprises a first lithium salt, and optionally further comprises a second doping agent, wherein the second doping agent contains the element M';
wherein the manganese salt, the cobalt salt, the nickel salt, the first doping agent, the first lithium salt, and the second doping agent are used in amounts such that the first substance is prepared.

7. The method of claim 6, wherein the second mixing in step (1) is performed in a reaction vessel, the conditions of the second mixing comprise: a temperature of 20-60° C., a time of 6-30 h, a rotation speed of 300-1,000 rpm and a pH of 7-12.

8. The method of claim 6, wherein the third mixing in step (2) is performed in an oxygen-containing atmosphere, the conditions of the third mixing comprise: initially carrying out a reaction under the first conditions to obtain a reactant, then subjecting the reactant to a reaction under the second conditions, wherein the first conditions comprise a temperature of 300-600° C. and a heat preservation time of 1-6 h; the second conditions comprise a temperature of 650-1,000° C. and a heat preservation time of 4-20 h.

9. The method of claim 4, the method further comprises the following steps to prepare the second substance:
(a) subjecting the ingredients of the component E to a fourth mixing, in the presence of a second solvent, so as to obtain a coating layer precursor, wherein the component E comprises a second complexing agent, a second precipitating agent and a metal salt containing the element N, and optionally further comprises a third doping agent, wherein the third doping agent contains the element N';
(b) subjecting the coating layer precursor, a second lithium salt and a sodium salt to a fifth mixing to obtain a coating layer intermediate product;
(c) subjecting the coating layer intermediate product and a third lithium salt to a sixth mixing, so as to prepare a coating layer substance B;
the total amount of the second lithium salt and the third lithium salt and the amount of the metal salt and the amount of the third doping agent are used in amounts such that the second substance is prepared.

10. The method of claim 9, wherein the fourth mixing in step (a) is performed in a reaction vessel, the conditions of the fourth mixing comprises: a temperature of 20-50° C., a time of 5-15 h, a rotation speed of 300-1,000 rpm and a pH of 7-12.

11. The method of claim 9, wherein the conditions of the fifth mixing in step (b) comprise: the fifth mixing is performed in an oxygen-containing atmosphere at a temperature of 600-1,000° C. and a time of 4-20 h.

12. The method of claim 9, wherein the conditions of the sixth mixing in step (c) comprise: the sixth mixing is performed in an oxygen-containing atmosphere at a temperature of 300-700° C. and a time of 2-20 h.

13. The method of claim 4, wherein the lithium-manganese rich material has a median particle diameter D50 of 6-20 μm.

14. The method of claim 4, wherein the lithium-manganese rich material has a specific surface area of 2-7.5 m2/g.

15. A lithium ion battery that contains the lithium-manganese rich material of claim 1.

* * * * *